Feb. 16, 1965     R. L. YOUNG     3,169,844
AIR FILTER

Filed Jan. 24, 1961     2 Sheets-Sheet 1

INVENTOR
RALPH L. YOUNG

BY *Shoemaker and Mattare*

ATTORNEYS

Feb. 16, 1965 R. L. YOUNG 3,169,844
AIR FILTER
Filed Jan. 24, 1961 2 Sheets-Sheet 2

INVENTOR
RALPH L. YOUNG
BY Shoemaker and Mattare
ATTORNEYS

United States Patent Office 3,169,844
Patented Feb. 16, 1965

3,169,844
AIR FILTER
Ralph L. Young, Gastonia, N.C., assignor to Wix Corporation, Gastonia, N.C., a corporation of North Carolina
Filed Jan. 24, 1961, Ser. No. 84,650
3 Claims. (Cl. 55—498)

This invention relates broadly to the class of filters and is directed to improvements in air filters and more especially to filters of the type designed to be used in connection with air breathing machine units such, for example, as internal combustion engine carburetors and the like.

In certain types of machines operated by small or lightweight internal combustion engines and particularly engines used for operating or driving lightweight machines such as hand-held chain saws, the air filter units embody filtering elements for the air intake of the carburetor forming a part of the machine, which elements are conventionally removably held in a casing and the filter element in the casing has a sealing connection between end portions thereof and adjacent end portions of the wall of the casing.

In air filters of the type referred to there is a problem of obtaining and maintaining a good sealing connection between end portions of the filter element in the casing and adjacent end walls of the casing so as to insure that all air flowing to the carburetor will pass through the filter element and accordingly it is a particular object of the present invention to provide a new and novel filter unit having a molded end seal or gasket by means of which a positive or tight sealing connection can be obtained between the ends of the filter element and cooperating wall portions of the casing.

Another object of the invention is to provide an improved air filter element having a novel molded end seal or gasket wherein such gasket is formed in a manner whereby the element when introduced into the protective housing or casing will automatically center and seat itself and establish a good three-point sealing contact with surrounding portions of the casing wall.

The invention broadly contemplates the provision of an elongate fluted annulus of filter paper material, or filter material of any suitable character, enclosed by or encased within a foraminous protective sleeve and having the ends of the fluted annulus and the ends of the protective sleeve embedded in a molded sealing ring. The axially directed ends of the sealing ring are formed with a novel cross sectional contour whereby to provide the said desired three-point sealing contact with end portions of the wall of an enclosing or protective casing and which wall end portions have surfaces designed to cooperate with the said ends of the sealing rings to accomplish such result.

The invention will be best understood from a consideration of the following detailed description taken in connection with the accompanying drawings forming a part of this specification with the understanding, however, that the invention is not confined to a strict conformity with the showing of the drawings but may be changed or modified so long as such changes or modifications mark no material departure from the salient features of the invention as defined by the appended claims.

Figure 1:
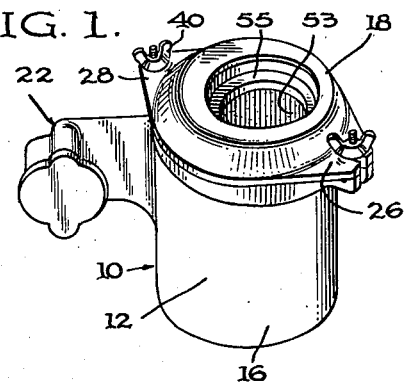
FIG. 1 is a view in perspective of a conventional air filter casing designed to receive the new and novel filter unit of the present invention.
Figure 2:
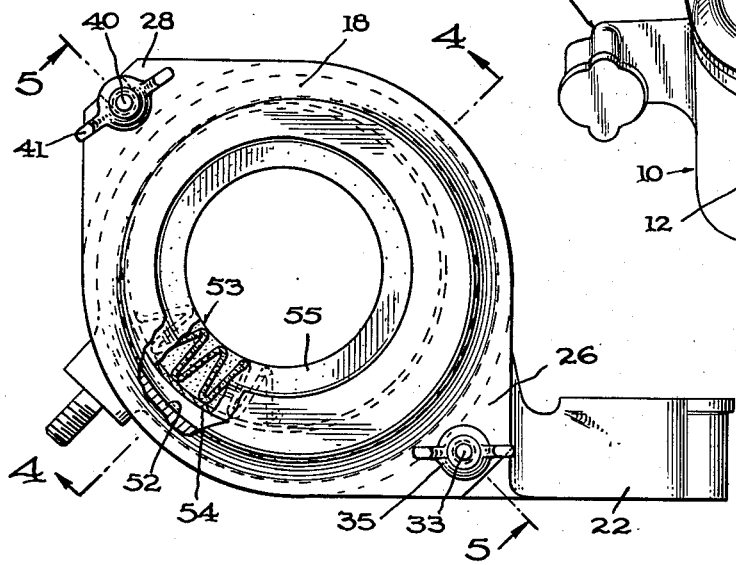
FIG. 2 is a view in top plan on an enlarged scale of the filter structure shown in FIG. 1, with portions of the casing top and of the filter element in the casing broken away.
Figure 3:
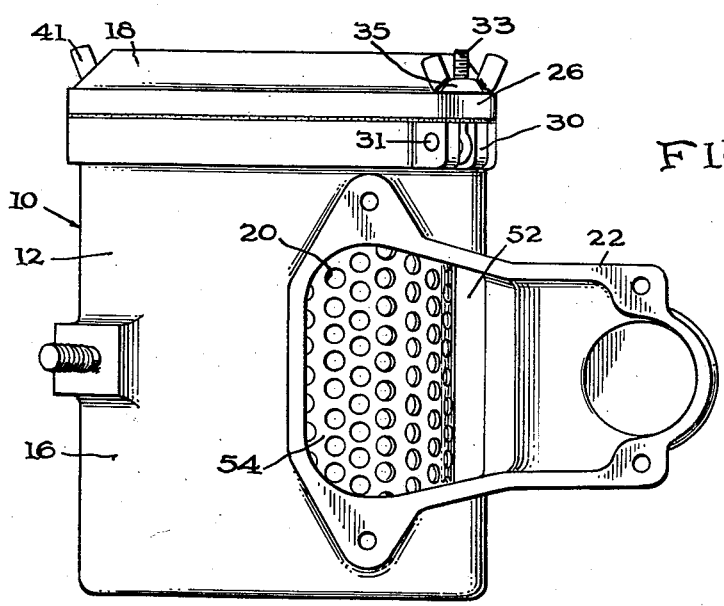
FIG. 3 is a view in side elevation of the filter structure looking into the open air intake side of the mounting arm.

Referring now more particularly to the drawings the numeral 10 generally designates an air filter structure embodying as an element thereof the improved filtering unit of the present improved design.

The improved filter unit is enclosed within the housing or casing which is generally designated 12, the unit therein being generally designated 14.

The casing 12 here illustrated is of a conventional form and embodies a cylindrical wall portion 16 and a closure cap or top 18 removably secured to one end thereof.

The casing wall 16 is provided with an air discharge or outlet opening 20 and formed integral with the wall and outlining the opening is a hollow mounting arm which is generally designated 22 by which the filter structure is secured to a part of the machine with which it is to be used. Through this arm filtered air passes to the machine carburetor.

Figure 5:
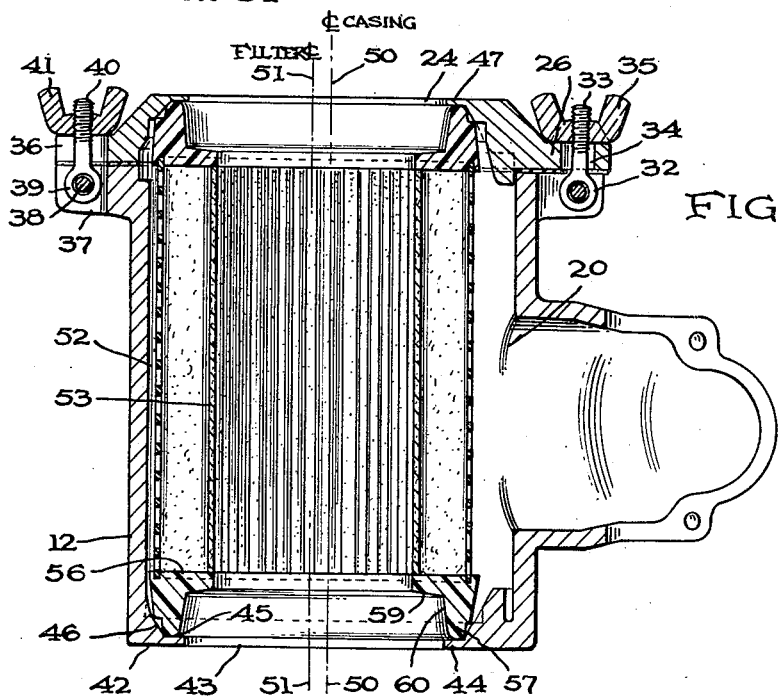
FIG. 5 is a longitudinal section through the filter structure taken substantially on the line 5—5 of FIG. 2.

The cap or top 18 has a central air intake opening 24 therethrough and at opposite sides thereof are the attaching ears 26 and 28. The ear 26 overlies a pair of spaced lugs 30 between which is connected a pin 31 which passes through the eye 32 of an attaching eye bolt 33 which, as shown in FIG. 5, extends upwardly through an aperture 34 in the ear 26 to receive the wing nut 35. The opposite ear 28 is slotted as indicated at 36 and overlies a pair of lugs 37, one only of which is shown, between which extends the pin 38 and this pin passes through the eye 39 of an eye bolt 40 which is adapted to extend up through the slot 36 to receive a securing wing nut 41. Thus the cap 18 can be readily released at the ear 28 and swung to open position after the wing nut 35 is loosened sufficiently, to permit the insertion or removal into the casing of the filter unit 14.

The end of the casing opposite from the cap 18 has the wall 42 through the center of which is formed the air intake opening 43 which is aligned with the air intake opening 24 of the cap.

Upon its inner side the wall 42 is of reduced thickness around the opening 43 to provide the opening defining flange 44, the inner side of which flange forms a gasket seating surface 45 which merges with an upwardly and outwardly inclined shoulder 46 forming a second gasket seating surface.

The cap or closure top 18 is similarly formed on its inner side to form the opening encircling flange 47, the inner side of which forms a gasket seating surface 48, and an outwardly inclined shoulder 49 forming a second gasket seating surface with which the surface 48 joins.

Figure 4:
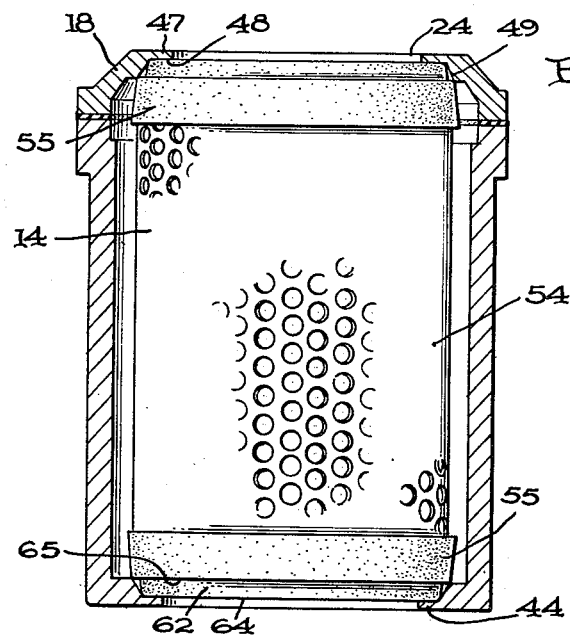
FIG. 4 is a longitudinal section through the filter structure taken substantially on the line 4—4 of FIG. 2.

The seating surfaces at the two ends of the casing and the air intake openings are coaxial as is readily apparent from the showing of FIGS. 4 and 5. However, such surfaces and openings are eccentric to the true center or axis of the casing as shown in FIG. 5 where the axis of the casing is designated by the line 50 while the axial center of the openings and also of the filter unit 14 is designated by the center line 51. Thus it will be seen from this figure that the elongate annular filter unit 14 is offset within the casing away from the air discharge or outlet opening 20 and the inside diameter of the casing is materially greater than the outside diameter of the filter unit so that the filter unit when in the casing will be surrounded by an air space or chamber which is generally designated 52 and which is larger near the air outlet or discharge opening 20 than at the opposite side of the casing.

The filter unit which is generally designated 14 comprises the elongate fluted annular filter material body 53. The flutes of the body 53 extend longitudinally thereof and this body is enclosed in a foraminous jacket or sleeve 54 which serves to strengthen the body 53. The filter material body is formed of a suitable weight filter paper and the sleeve 54 maintains the latter against deformation by the pressure of air passing therethrough.

Each of the ends of the body 53 and of the casing sleeve or jacket 54 is embedded in a molded sealing ring or gasket which is generally designated 55. These gaskets are of duplicate form or design and therefore description of one applies to both and the same reference numerals will be used for both gaskets.

Figure 6:
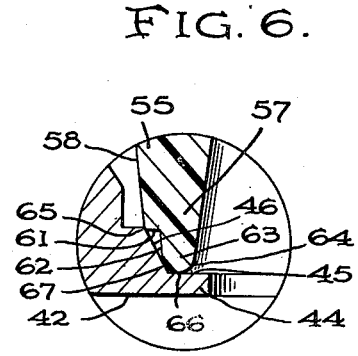
FIG. 6 is a detail taken on an enlarged scale illustrating more clearly the sealing contact points between the molded sealing ring and adjacent portions of the casing wall.

Each gasket 55 comprises an inner end 56 of maximum radial thickness and an outer end 57 of minimum radial thickness. The inner radially thickened end has the adjacent ends of the filter material body and sleeve embedded therein or in other words, this inner end of the gasket is molded around the ends of the body 53 and sleeve 54 so that the ends of the flutes of the body 53 are closed by the molded gasket material. The gasket 55 has an outer surface 58 which tapers toward the outer end 57 and the inner end portion on the inner side of the gasket is undercut as indicated at 59 and merges with the tapered end wall surface 60. These surfaces 58 and 60 are convergent toward the outer end of the gasket and the inner surface 60 extends entirely to the outer end while the outer surface 58 is interrupted by an undercut portion forming a shoulder 61 which joins the short tapered outer surface 62. This short surface 62 forms with the inner tapered surface 60, an annular tongue 63 having a transversely rounded or substantially semi-circular edge 64. The annular tongue at each end of the filter unit is of an outside diameter which will permit it to seat on the inner surface of the flange 44 or the inner surface of the flange 47 and bridge along its outer side the angle between the adjacent surfaces 45 and 46 or 48 and 49, as illustrated in FIG. 6. Further, the spacing of the undercut shoulder 61 from the bottom of the tongue portion 63 is such that the edge of a corner 65 formed at the intersection of the surfaces 58 and 61 will engage the adjacent inclined wall surface 46 or 49, this corner thus forming an annular sealing edge.

The rounded edge 64 of the tongue 63, in bearing upon the inner surface of the adjacent flange and against the adjacent inclined surface which joins the flange provides two annular sealing lines which are designated 66 and 67. Thus when the molded gasket at each of the ends of the filter unit is seated upon the supporting surfaces either at the bottom end of the casing or at the under side of the cap, three positive sealing points of annular form will be obtained.

In FIG. 6 where the relationship between the sealing points of the gasket and the adjacent portion of the casing is detailed, the reference characters applied relate to the bottom wall 42 of the casing but it will be apparent that this same relationship exists between the gasket at the opposite end of the filter unit and the inner surfaces of the casing.

It will also be apparent that there is a conjoint action or relationship between the gasket at the ends of the filter unit and the surrounding surfaces of the casing which not only provides a very effective seal but which facilitates the automatic positioning or centering of the filter unit when it is introduced into the body of the casing and the cap or lid is swung into closed position and secured by the thumb nuts 35 and 41. Accordingly, when the filter structure is in use the air drawn into the machine to which the filter is attached will flow into the filter through both ends of the filter unit and be drawn therefrom through the filter body into the air space or chamber 52 and there will be no leakage of unfiltered air into the chamber 52 around the gasket between the same and the encircling portions of the housing body and the housing cap.

The gaskets 55 which are molded onto the ends of the filter body and the encasing foraminous sleeve may be formed of any suitable elastomer either of a synthetic or a natural nature. Accordingly, it is to be understood that the gaskets may be made or formed of any material which is satisfactory both for molding into the desired shape on the ends of the filter body and for maintaining its soft or elastic character indefinitely so as to obtain the desired sealing action through conformation of the gasket to any irregularities against which it may be pressed.

In the use and operation of the present invention the casing arm 22 is secured to the appropriate part of the machine for directing the flow of filtered air through the hollow arm to the machine carburetor intake.

The air flows into the casing through the two end openings 24 and 43 and when the filter unit is installed therein as illustrated in FIGURE 5 the air passes through these openings 24 and 43 into the filter unit by way of the annular end gaskets 55 and then passes or is drawn through the fluted filter material 53 into the surrounding air space 52 from which the air, now filtered, passes through the opening 20 to flow through the hollow mounting arm 22 to the carburetor.

The multiple seal between each of the gaskets and surrounding surfaces of the casing effectively prevents unfiltered air being drawn into the air space 52 between the ends of the filter unit and the ends of the casing.

The molded sealing rings 55 initially have the form illustrated in FIGURES 4, 5 and 6 and when the unit is enclosed in the casing three annular sealing lines of contact are effected between each sealing ring or gasket and surrounding parts of the casing, at the locations designated 65, 66 and 67.

I claim:

1. An air filter comprising in combination with an annular casing having opposite end air inlet openings and a side wall air outlet opening, each of said end openings being defined by an encircling annular axially inwardly facing flat seat lying inside the casing in a plane substantially perpendicular to the longitudinal axis of the casing and by an inwardly and laterally sloping annular surface intersecting the seat and forming an obtuse angle therewith; a filter unit within the casing comprising an annular fluted body of filter material having open ends and having an annular elastomer gasket joined to and extending around each open end and each gasket being formed to make three separate and distinct annular lines of sealing contact with a flat seat and sloping annular surface.

2. An air filter comprising in combination with an annular casing having opposite end air inlet openings and a side wall air outlet opening, each of said end openings being defined by an encircling annular axially inwardly facing flat seat lying inside the casing in a plane substantially perpendicular to the longitudinal axis of the casing and by an inwardly and laterally sloping annular surface intersecting the seat and forming an obtuse angle therewith; a filter unit within the casing comprising an annular fluted body of filter material having open ends and having an annular elastomer gasket joined to and extending around each open end and each gasket being formed to provide an annular terminal sealing tongue having a rounded edge and a diameter to seat against a flat seat and the said intersecting surface in the obtuse angle formed thereby to form two separate and distinct annular lines of sealing contact between the gasket and the casing and the radial outer side of each gasket being formed to provide an encircling sealing edge for contact with the said sloping annular surface to form a third annular line of sealing contact between the gasket and the casing.

3. An air filter unit in combination with an elongate casing having air inlet end openings and a side wall air outlet opening and wherein the casing has at each end opening an inwardly projecting flange having an inner circular axially inwardly directed flat surface providing a first gasket seat, a longitudinally extending laterally outwardly inclined annular wall rising from said surface and forming a second gasket seat and terminating in an annular corner spaced longitudinally inwardly of the adjacent seat; said air filter unit consisting of an elongate cylindrical body of filter material having open air inlet ends each positioned at and aligned with and adapted to receive air through an air inlet end opening of the casing, a foraminous sleeve surrounding and encasing said body and an annular elastomer gasket at each end and of substantial thickness in the axial direction of the unit and having a continuous inner end surface lying in a plane extending radially of the unit and in which surface an end of the filter body and an end of the surrounding sleeve are imbedded, each gasket including an axially extending annular portion of a radial thickness materially less than the radial width of the said inner end surface and having opposite inner and outer surfaces facing in the radial direction of the unit and tapering to a terminal edge of substantially semi-circular cross section, the said outer radially facing surface being interrupted by an undercut shoulder forming a sharp sealing edge which is adapted to have sealing engagement with an inclined annular wall of the casing when the unit is in position in the casing, the said semi-circular terminal edge being adapted to seat with an annular sealing line contact against an inner circular surface of an inwardly projecting flange of the casing and the outer side of said semi-circular terminal edge being adapted to have an annular sealing line contact with the said inclined annular wall of the casing between said sharp sealing edge and said annular sealing line contact of the semi-circular edge with the flange surface.

References Cited by the Examiner
UNITED STATES PATENTS

| | | | |
|---|---|---|---|
| 2,695,183 | 11/54 | Andrew et al. | 285—334.4 |
| 2,732,031 | 1/56 | Rabbitt et al. | |
| 2,733,831 | 2/56 | Nehls | 220—46 |
| 2,828,043 | 3/58 | Hosford | 220—46 |
| 2,962,121 | 11/60 | Wilber | 55—504 |
| 2,968,361 | 1/61 | Buckman | 210—493 |
| 2,988,170 | 6/61 | Pritchard | 55—502 |
| 3,056,503 | 10/62 | Roosa | 210—453 |
| 3,064,853 | 11/62 | Lents et al. | 220—46 |

FOREIGN PATENTS

| | | |
|---|---|---|
| 1,021,148 | 11/52 | France. |
| 470,607 | 6/27 | Germany. |

REUBEN FRIEDMAN, *Primary Examiner.*

HERBERT L. MARTIN, HARRY B. THORNTON, WALTER BERLOWITZ, *Examiners.*